(12) United States Patent
Yonge, III et al.

(10) Patent No.: US 8,170,051 B2
(45) Date of Patent: May 1, 2012

(54) IN-HOME COEXISTENCE NETWORK

(75) Inventors: Lawrence W. Yonge, III, Ocala, FL (US); Srinivas Katar, Gainesville, FL (US)

(73) Assignee: Qualcomm Atheros, Inc., San Jose, CA (US)

( * ) Notice: Subject to any disclaimer, the term of this patent is extended or adjusted under 35 U.S.C. 154(b) by 274 days.

(21) Appl. No.: 12/133,312

(22) Filed: Jun. 4, 2008

(65) Prior Publication Data
US 2009/0034552 A1 Feb. 5, 2009

Related U.S. Application Data

(60) Provisional application No. 60/941,949, filed on Jun. 4, 2007.

(51) Int. Cl.
*H04L 12/43* (2006.01)

(52) U.S. Cl. ...................................................... 370/458

(58) Field of Classification Search ........... 370/431–463
See application file for complete search history.

(56) References Cited

U.S. PATENT DOCUMENTS

| | | |
|---|---|---|
| 4,578,530 A | 3/1986 | Zeidler |
| 4,689,786 A | 8/1987 | Sidhu et al. |
| 4,807,248 A | 2/1989 | Pyatt et al. |
| 5,328,530 A | 7/1994 | Semiatin et al. |
| 5,359,625 A | 10/1994 | Vander Mey et al. |
| 5,570,355 A | 10/1996 | Dail et al. |
| 5,732,076 A | 3/1998 | Ketseoglou |
| 6,074,086 A | 6/2000 | Yonge, III |
| 6,111,919 A | 8/2000 | Yonge, III |
| 6,141,355 A | 10/2000 | Palmer et al. |
| 6,167,137 A | 12/2000 | Marino et al. |
| 6,173,400 B1 | 1/2001 | Perlman et al. |
| 6,185,185 B1 | 2/2001 | Bass et al. |
| 6,188,690 B1 | 2/2001 | Holden et al. |
| 6,189,040 B1 | 2/2001 | Oohara |
| 6,201,794 B1 | 3/2001 | Stewart et al. |
| 6,243,761 B1 | 6/2001 | Mogul et al. |
| 6,269,132 B1 | 7/2001 | Yonge, III |
| 6,269,163 B1 | 7/2001 | Rivest et al. |

(Continued)

FOREIGN PATENT DOCUMENTS

EP 1748574 1/2007

(Continued)

OTHER PUBLICATIONS

International Search Report and Written in Opinion in PCT Application No. PCT/US2009/047530, Aug. 27, 2009, 9 pages.

(Continued)

*Primary Examiner* — Derrick Ferris
*Assistant Examiner* — Mang Yeung
(74) *Attorney, Agent, or Firm* — Meyertons Hood Kivlin Kowert & Goetzel, P.C.

(57) ABSTRACT

Systems and methods for dynamic allocation of network bandwidth. In some examples, a guaranteed interval period, including a guaranteed interval start time and guaranteed interval end time, can be identified based upon policy. Network stations can then identify first interval start times and first interval end times different than the guaranteed start times and guaranteed end time provided by policy. An access network can thereby provide a first interval start time and a first interval end time to stations within the access network. An in-home network can determine an in-home interval period based upon the first interval start time and first interval end time.

35 Claims, 9 Drawing Sheets

U.S. PATENT DOCUMENTS

| | | |
|---|---|---|
| 6,272,135 B1 | 8/2001 | Nakatsugawa |
| 6,278,685 B1 | 8/2001 | Yonge, III et al. |
| 6,307,940 B1 | 10/2001 | Yamamoto et al. |
| 6,310,892 B1 | 10/2001 | Olkin |
| 6,388,995 B1 | 5/2002 | Gai et al. |
| 6,519,231 B1 | 2/2003 | Ding et al. |
| 6,574,195 B2 | 6/2003 | Roberts |
| 6,606,303 B1 | 8/2003 | Hassel et al. |
| 6,631,136 B1 | 10/2003 | Chowdhury et al. |
| 6,711,163 B1 | 3/2004 | Reid et al. |
| 6,775,656 B1 | 8/2004 | Gettwart et al. |
| 6,804,252 B1 | 10/2004 | Johnson |
| 6,904,462 B1 | 6/2005 | Sinha |
| 6,910,136 B1 | 6/2005 | Wasserman et al. |
| 7,039,021 B1 | 5/2006 | Kokudo |
| 7,085,284 B1 | 8/2006 | Negus |
| 7,181,620 B1 | 2/2007 | Hur |
| 7,234,058 B1 | 6/2007 | Baugher et al. |
| 7,346,021 B2 | 3/2008 | Yoshizawa et al. |
| 7,350,076 B1 | 3/2008 | Young et al. |
| 7,352,770 B1 | 4/2008 | Yonge, III |
| 7,369,579 B2 | 5/2008 | Logvinov et al. |
| 7,409,543 B1 | 8/2008 | Bjorn |
| 7,496,039 B2 | 2/2009 | Yamada et al. |
| 7,506,042 B2 | 3/2009 | Ayyagari |
| 7,609,681 B2 | 10/2009 | Kurobe et al. |
| 7,797,751 B1 | 9/2010 | Hughes et al. |
| 7,826,618 B2 | 11/2010 | Klingler et al. |
| 7,894,487 B2 | 2/2011 | Yonge, III |
| 7,949,356 B2 | 5/2011 | Yonge, III |
| 2001/0000709 A1 | 5/2001 | Takahashi et al. |
| 2002/0015496 A1 | 2/2002 | Weaver, III |
| 2002/0025810 A1 | 2/2002 | Takayama et al. |
| 2002/0029260 A1 | 3/2002 | Dobbins et al. |
| 2002/0060986 A1 | 5/2002 | Fukushima et al. |
| 2002/0097679 A1 | 7/2002 | Berenbaum |
| 2002/0107023 A1 | 8/2002 | Chari et al. |
| 2002/0114303 A1 | 8/2002 | Crosbie et al. |
| 2002/0122411 A1 | 9/2002 | Zimmerman et al. |
| 2002/0124177 A1 | 9/2002 | Harper et al. |
| 2002/0137462 A1 | 9/2002 | Rankin |
| 2002/0141417 A1 | 10/2002 | Umayabashi |
| 2003/0012166 A1* | 1/2003 | Benveniste .................. 370/338 |
| 2003/0018812 A1 | 1/2003 | Lakshminarayana et al. |
| 2003/0048183 A1 | 3/2003 | Vollmer et al. |
| 2003/0086437 A1 | 5/2003 | Benveniste |
| 2003/0095551 A1 | 5/2003 | Gotoh et al. |
| 2003/0137993 A1 | 7/2003 | Odman |
| 2003/0193959 A1 | 10/2003 | Lui et al. |
| 2003/0224784 A1 | 12/2003 | Hunt et al. |
| 2003/0228846 A1 | 12/2003 | Berliner et al. |
| 2004/0047319 A1 | 3/2004 | Elg |
| 2004/0070912 A1 | 4/2004 | Kopp |
| 2004/0081089 A1 | 4/2004 | Ayyagari et al. |
| 2004/0090982 A1 | 5/2004 | Xu |
| 2004/0165532 A1 | 8/2004 | Poor et al. |
| 2004/0190542 A1 | 9/2004 | Ono et al. |
| 2004/0210630 A1 | 10/2004 | Simonnet et al. |
| 2004/0218577 A1 | 11/2004 | Nguyen et al. |
| 2004/0234073 A1 | 11/2004 | Sato et al. |
| 2004/0264428 A1 | 12/2004 | Choi et al. |
| 2005/0001694 A1 | 1/2005 | Berkman |
| 2005/0021539 A1 | 1/2005 | Short et al. |
| 2005/0025176 A1 | 2/2005 | Ko et al. |
| 2005/0068227 A1 | 3/2005 | Caspi et al. |
| 2005/0071631 A1 | 3/2005 | Langer |
| 2005/0089005 A1* | 4/2005 | Sakoda et al. ................ 370/348 |
| 2005/0114489 A1 | 5/2005 | Yonge, III |
| 2005/0117515 A1 | 6/2005 | Miyake |
| 2005/0117750 A1 | 6/2005 | Rekimoto |
| 2005/0135291 A1 | 6/2005 | Ketchum et al. |
| 2005/0147075 A1 | 7/2005 | Terry |
| 2005/0169222 A1* | 8/2005 | Ayyagari et al. ............. 370/338 |
| 2005/0190785 A1 | 9/2005 | Yonge, III et al. |
| 2005/0210157 A1* | 9/2005 | Sakoda .......................... 709/251 |
| 2005/0243765 A1 | 11/2005 | Schrader et al. |
| 2005/0249186 A1 | 11/2005 | Kelsey et al. |
| 2006/0002406 A1 | 1/2006 | Ishihara et al. |
| 2006/0039371 A1 | 2/2006 | Castro et al. |
| 2006/0072517 A1 | 4/2006 | Barrow et al. |
| 2006/0077997 A1 | 4/2006 | Yamaguchi et al. |
| 2006/0159260 A1 | 7/2006 | Pereira et al. |
| 2006/0168647 A1 | 7/2006 | Chiloyan |
| 2006/0224813 A1 | 10/2006 | Rooholamini et al. |
| 2006/0251021 A1 | 11/2006 | Nakano et al. |
| 2006/0256741 A1 | 11/2006 | Nozaki |
| 2006/0268746 A1 | 11/2006 | Wijting et al. |
| 2007/0025244 A1* | 2/2007 | Ayyagari et al. ............... 370/229 |
| 2007/0025384 A1 | 2/2007 | Ayyagari et al. |
| 2007/0025391 A1 | 2/2007 | Yonge, III et al. |
| 2007/0025398 A1 | 2/2007 | Yonge, III |
| 2007/0026794 A1 | 2/2007 | Ayyagari et al. |
| 2007/0030811 A1 | 2/2007 | Frei et al. |
| 2007/0053520 A1 | 3/2007 | Eckleder |
| 2007/0058661 A1 | 3/2007 | Chow |
| 2007/0058732 A1 | 3/2007 | Riedel et al. |
| 2007/0060141 A1 | 3/2007 | Kangude et al. |
| 2007/0097867 A1 | 5/2007 | Kneckt et al. |
| 2007/0133388 A1 | 6/2007 | Lee et al. |
| 2007/0133449 A1 | 6/2007 | Schacht et al. |
| 2007/0140185 A1 | 6/2007 | Garg et al. |
| 2007/0147322 A1 | 6/2007 | Agrawal et al. |
| 2007/0220570 A1* | 9/2007 | Dawson et al. ................ 725/111 |
| 2007/0271398 A1* | 11/2007 | Manchester et al. .......... 709/249 |
| 2007/0286074 A1 | 12/2007 | Xu |
| 2008/0181219 A1 | 7/2008 | Chen et al. |
| 2008/0186230 A1 | 8/2008 | Wengler et al. |
| 2008/0212591 A1 | 9/2008 | Wu et al. |
| 2008/0279126 A1 | 11/2008 | Katar et al. |
| 2009/0067389 A1 | 3/2009 | Lee et al. |
| 2009/0106551 A1 | 4/2009 | Boren et al. |
| 2009/0116461 A1 | 5/2009 | Yonge, III |
| 2009/0154487 A1 | 6/2009 | Ryan et al. |
| 2009/0311963 A1 | 12/2009 | Haverty |
| 2010/0014444 A1 | 1/2010 | Ghanadan et al. |
| 2010/0091760 A1 | 4/2010 | Yoon |
| 2010/0100724 A1 | 4/2010 | Kaliski, Jr. |

FOREIGN PATENT DOCUMENTS

| | | |
|---|---|---|
| EP | 1748597 A1 | 1/2007 |
| EP | 1179919 | 7/2010 |
| JP | 3107317 A | 5/1991 |
| JP | 2002135177 A | 5/2002 |
| JP | 2005073240 A | 3/2005 |
| WO | WO9634329 A1 | 10/1996 |
| WO | WO9857439 A1 | 12/1998 |
| WO | WO02103943 A1 | 12/2002 |
| WO | WO03100996 A2 | 12/2003 |
| WO | WO2004038980 A2 | 5/2004 |

OTHER PUBLICATIONS

Faure, Jean-Philippe et al., Call for Submissions. Draft Standard for Broadband over Power Line Networks: Medium Access Control and Physical Layer Specifications. Feb. 14, 2007, 4 pages.

Faure, Jean-Philippe et al., Coexistence/interoperability Cluster, FTR SG Requirements. Draft Standard for Broadband over Power Line Networks: Medium Access Control and Physical Layer Specifications. Feb. 5, 2007, 13 pages.

Afkhamie et al., "An Overview of the upcoming HomePlug AV Standard", May 2005, IEEE 0-7803-8844-5/05, pp. 400-404.

European Search Report—EP09178487, Search Authority, Munich Patent Office, Jan. 21, 2010.

HomePlug Powerline Alliance Inc., "HomePlug AV White Paper," Doc. Ver. Number HPAVWP—050818, Aug. 2005, pp. 1-11.

International Search Report and Written Opinion—PCT/US2008/065811, International Searching Authority, European Patent Office, Nov. 25, 2008.

International Search Report and Written Opinion—PCT/US2008/065831, International Searching Authority, European Patent Office, Feb. 20, 2009, 22 pages.

Katar et al., "Beacon Schedule Persistence to Mitigate Beacon Loss in HomePlug AV Networks," May 2006, IEEE 1-4244-0113-05/06, pp. 184-188.

Lee et al., "HomePlug 1.0 Powerline Communication LANs-Protocol Description and Performance Results version 5.4," 2000, International Journal of Communication Systems, 2000 00: 1-6, pp. 1-25.

Loh et al, Quality of Support and priority Management in HomePNA 2.0 Link Layer, IEEE, 6 pages, 2003.

Notification of First Office Action, The State Intellectual Property Office of the People's Republic of China, issued in Chinese Application No. 200610107587.1, dated Oct. 11, 2010, 6 pages.

Notification of Reasons for Rejection, Japanese Patent Office, issued in Japanese Patent Application No. 2006-205200, dated Jan. 18, 2011, 3 pages.

Opera Specification-Part 1: Technology, Open PLC European Research Alliance, 198 pages, 1006.

\* cited by examiner

IN-HOME COEXISTENCE NETWORK

RELATED APPLICATIONS

This application is a utility application claiming priority to U.S. Provisional Application Ser. No. 60/941,949, entitled "MANAGING COMMUNICATIONS OVER A SHARED MEDIUM," filed on Jun. 4, 2007, which is hereby incorporated by reference.

TECHNICAL FIELD

The invention relates to managing communications over a shared medium.

BACKGROUND

A network of communication stations can share a communication medium (e.g., wires connecting multiple stations or spectrum for transmitting radio signals among stations) using any of a variety of access techniques. Some access techniques (e.g., carrier sense multiple access (CSMA) techniques) include a contention period in which stations contend for use of the medium for transmitting a signal by sensing when the medium is idle. In CSMA techniques, "collisions" sometimes occur when signals from two or more stations overlap. Some channel access techniques can also provide a time division multiple access (TDMA) period in which a specific station or stream is provided exclusive control of the medium. Typical TDMA and CSMA channel access techniques are used to share medium between stations of the same type. However, in environments where stations or networks of different types are present, additional means of efficiently segregating traffic from various networks becomes necessary.

SUMMARY

Systems, methods and computer readable media operable to provide for sharing of network resources are described herein. Example methods for sharing network resources can include: determining a guaranteed interval period comprising a guaranteed interval start time and a guaranteed interval end time within a periodic interval of time based on a policy at one or more stations in an access network; determining at the one or more stations in the access network a first interval start time and a first interval end time within the periodic interval of time, wherein the first interval start times and first interval end times are different than the guaranteed interval start time and the guaranteed interval end time; providing the first interval start time and the first interval end time of the one or more stations in the access network to one or more in-home networks; and determining an in-home interval period at the in-home network based on the first interval start time and the first interval end time of the one or more stations in the access network.

Example systems can include one or more stations and one or more in-home networks. The stations can be operable to determine a guaranteed interval period comprising a guaranteed interval start time and a guaranteed interval end time within a periodic interval of time based on a policy. The stations can also determine a first interval start time and a first interval end time within the periodic interval of time. The first interval start times and first interval end times are different than the guaranteed interval start time and the guaranteed interval end time. The stations can further provide the first interval start time and the first interval end time of the one or more stations in the access network to one or more in-home networks. The one or more in-home networks can be configured to determine an in-home interval period based on the first interval start time and the first interval end time of the one or more stations in the access network.

Various other aspects of this disclosure will be found in the detailed description, drawings, and claims.

DETAILED DESCRIPTION

There are a many possible implementations of the invention, some example implementations are described below. However, such examples are descriptions of various implementations, and not descriptions of the invention, which is not limited to the detailed implementations described in this section but is described in broader terms in the claims.

Figure 1:
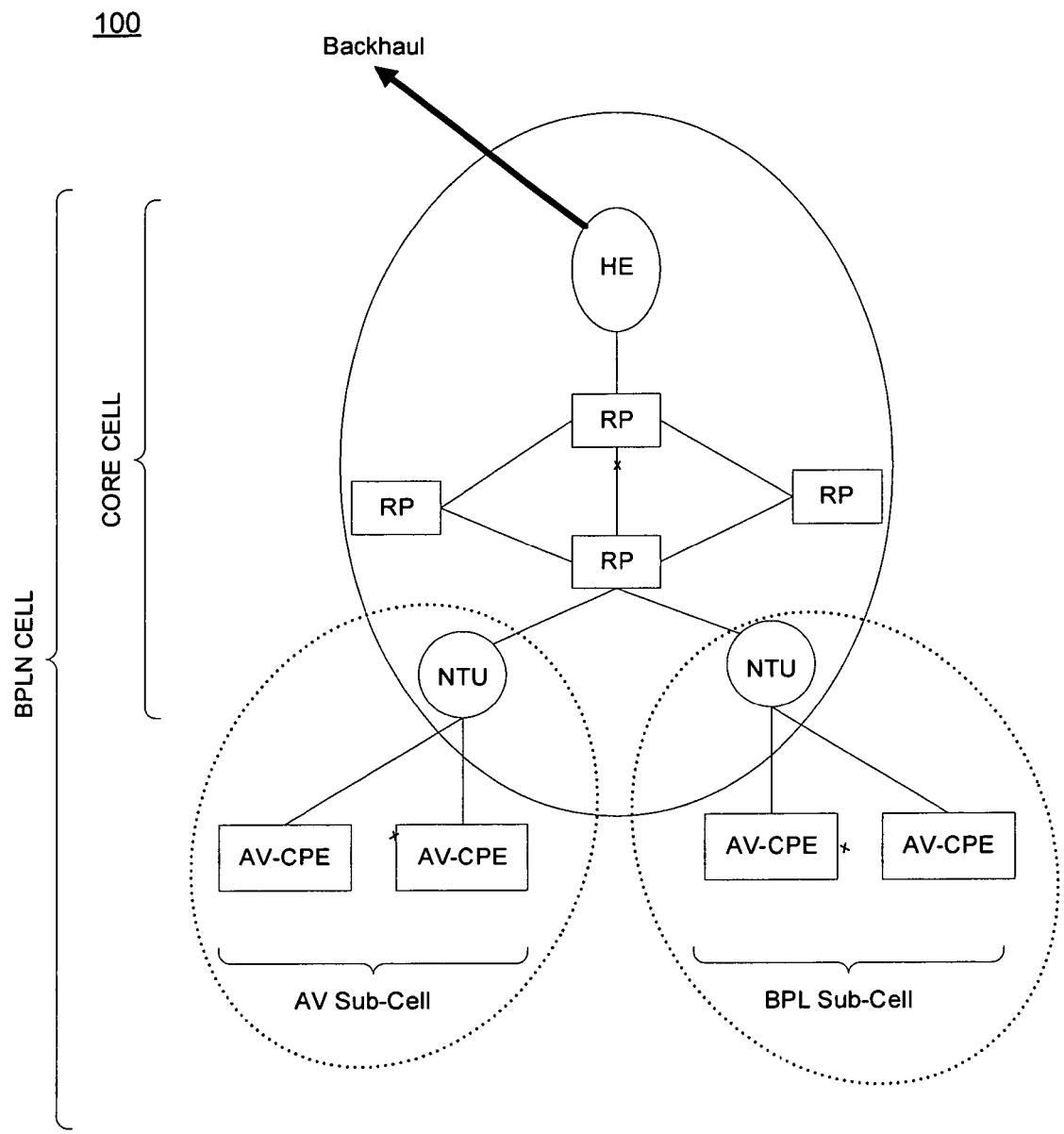
FIG. 1 is a schematic diagram of a communication network.

FIG. 1 shows an exemplary network configuration for an access network 100 such as a broadband power line Network (BPLN) that provides access to a backhaul network. The BPLN can be managed by a service provider entity having access to the underlying physical power line medium. BPLN is a general purpose network that can be used for several types of application including, smart grid management, broadband internet access, voice and video delivery services, etc. BPLN can be deployed on low voltage, medium voltage and high voltage power lines. BPLN can span the entire neighborhood or it may be deployed within a single Multi-dwelling Unit. For example, it can be used to provide network service to tenants in a single apartment building. While power lines are one medium for deploying the BPLN, the network can also be deployed on other wire lines like coaxial cables, twisted pair or a combination of these.

A BPLN can include one or more Cells. A cell is a group of broadband power line (BPL) devices in a BPLN that have similar characteristics such as association management, security, quality of service (QoS) and channel access settings, for example. Cells in a BPLN are logically isolated from each other, and communication to and from the backhaul occurs within the cell. Each cell in a BPLN includes a Core-Cell and may also include one or more Sub-Cells. There can be more than one cell on a given physical power line medium.

A Core-Cell includes a group of devices in a BPLN that includes a Head End (HE), Repeaters (RP), and Network Termination Units (NTU), but excludes Customer Premise Equipment (CPE). The Head End (HE) is a device that bridges a cell to the backhaul network. At a given time, a cell will have one active Head End and the Head End manages the cell including the Core-Cell and any associated Sub-Cells. A Repeater (RP) is a device that selectively retransmits MAC Service Data Units (MSDUs) to extend the effective range and bandwidth of the BPLN Cell. Repeaters also perform routing and QoS functions. The Network Termination Unit (NTU) is a device that connects a BPLN cell to the end users' network or devices. The NTU may in some cases bridge to other network technologies such as WiFi. A single NTU may serve more than one customer. Each Sub-Cell is associated with an active NTU. It can be noted that HE, NTU and RP are various roles of a station. In some implementations, a single device may be designed to play multiple roles. For example, a single device can simultaneously perform the functions of both a RP and NTU.

Various types of CPE devices are the endpoint nodes in the network and communicate with other nodes in the network through the NTU. Each node in the network communicates as a communication "station" (STA) using a physical (PHY) layer protocol that is used by the nodes to send transmissions to any other stations that are close enough to successfully receive the transmissions. STAs that cannot directly communicate with each other use one or more repeater STAs to communicate with each other.

Any of a variety of communication system architectures can be used to implement the portion of the network interface module that converts data to and from a signal waveform that is transmitted over the communication medium. An application running on a station provides and receives data to and from the network interface module. A MSDU is a segment of information received by the MAC layer. MAC layer processes the received MSDUs and generates "MAC Protocol Data Units" (MPDUs). A MPDU is a segment of information including header and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line by the PHY layer.

Apart from generating MPDUs from MSDUs, MAC layer can provide several functions including channel access control, providing the required QoS for the MSDUs, retransmission of corrupt information, routing and repeating. Channel access control can enable stations to share the powerline medium. Several types of channel access control mechanisms can be used by the MAC, including, for example, carrier sense multiple access with collision avoidance (CSMA/CA), centralized Time Division Multiple Access (TDMA), distributed TDMA, token based channel access, etc. Similarly, a variety of retransmission mechanisms can also be used. The PHY layer can also use a variety of techniques to enable reliable and efficient transmission over the transmission medium (power line, coax, twisted pair etc). Various modulation techniques like Orthogonal Frequency Division Multiplexing (OFDM), Wavelet modulations can be used. Forward error correction (FEC) code line Viterbi codes, Reed-Solomon codes, concatenated code, turbo codes, low density parity check code, etc., can be employed by the PHY to overcome errors. Some implementations of the MAC and PHY layers used by a powerline medium can be based on HomePlug AV specification.

In some implementations, the PHY uses OFDM modulation. Using OFDM modulation, data are transmitted in the form of OFDM "symbols." Each symbol has a predetermined time duration or symbol time Ts. Each symbol is generated from a superposition of N sinusoidal carrier waveforms that are orthogonal to each other and form the OFDM carriers. Each carrier has a peak frequency fi and a phase $\Phi i$ measured from the beginning of the symbol. For each of these mutually orthogonal carriers, a whole number of periods of the sinusoidal waveform is contained within the symbol time Ts. Equivalently, each carrier frequency is an integral multiple of a frequency interval $\Delta f=1/Ts$. The phases $\Phi i$ and amplitudes Ai of the carrier waveforms can be independently selected (according to an appropriate modulation scheme) without affecting the orthogonality of the resulting modulated waveforms. The carriers occupy a frequency range between frequencies f1 and fN referred to as the OFDM bandwidth.

Figure 2:
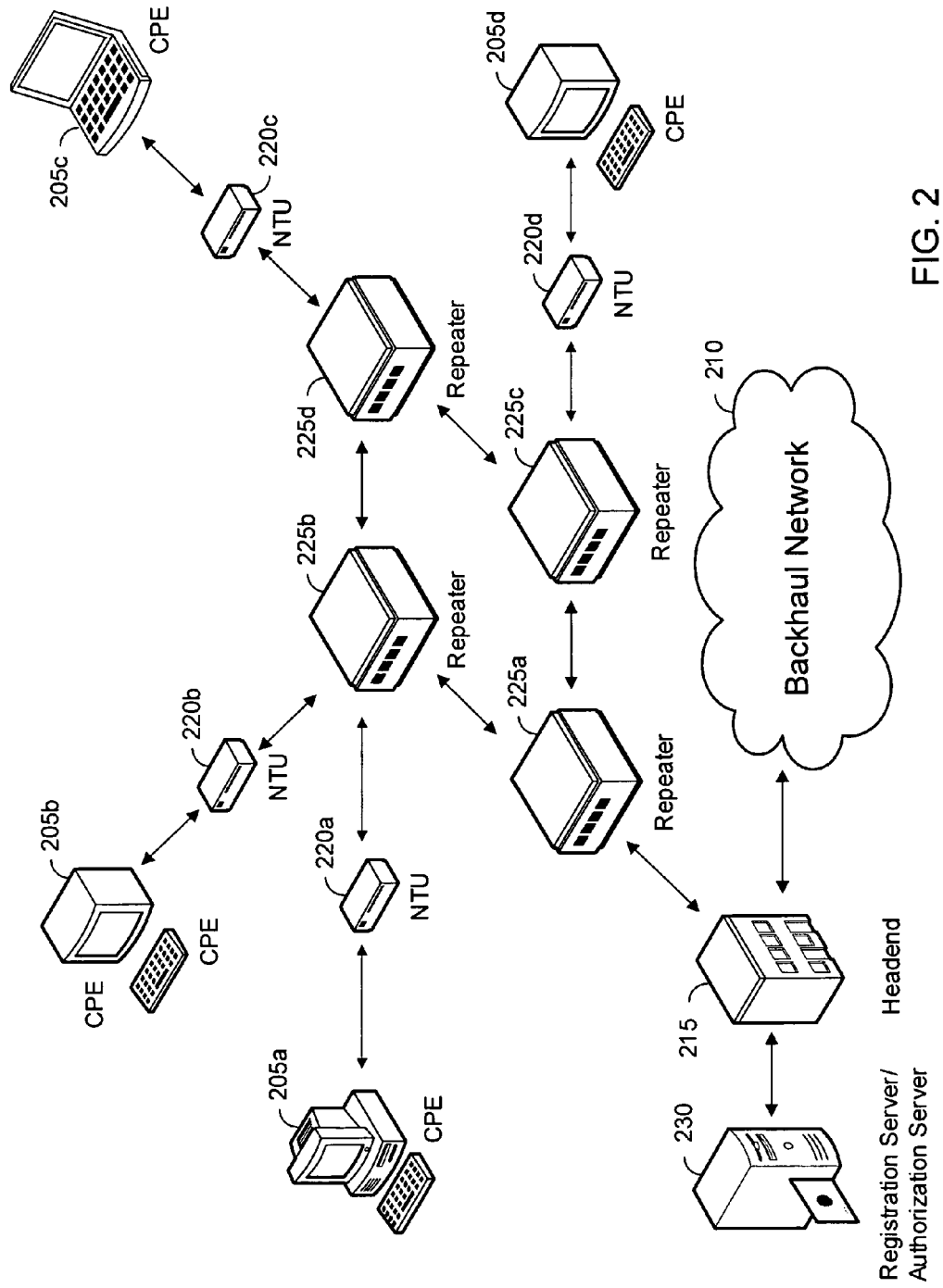
FIG. 2 is a block diagram of a communication system for communicating over the network.

FIG. 2 is a block diagram of a powerline communication network. In various implementations, a powerline communication network can enable customer premises equipment (CPE) devices 205a-d to access a backhaul network 210 through a gateway (e.g., a headend 215). In various implementations, there can be multiple gateways to the backhaul network 210. For example, it can be inefficient for a CPE device in one city to be required to send a signal to another city prior to accessing the backhaul network 210 (e.g., the Internet).

The CPE devices 205a-d can communicate with the headend 215 through a network of network termination units 220a-d and repeaters 225a-d. In some implementations, the network termination units can operate to translate the data signals from the CPE devices in any of a variety of communications protocols onto a powerline network. For example, a CPE 205a-d might communicate with an NTU 220a-d using a IEEE 802.11 wireless protocol, and the NTU 220a-d can convert the wireless signal to a signal suitable for transmission on a powerline medium. Systems for transmitting and receiving powerline network signals are further described in FIG. 3.

In various implementations, repeaters 225a-d can be located throughout the powerline network to provide the ability for a data signal to travel on the powerline carrier medium over long distances. As discussed above, the headend 215 can provide a gateway for the data signal to be transferred to a backhaul network 210. For example, the headend 215 can extract the data signal from the powerline network and convert the signal for transmission on a packet switched network such as the Internet. In various implementations, one or more of the repeaters 225a-d can be equipped to transfer the signal from the powerline network to the backhaul network 210.

In some implementations, the headend 215 can also include an authorization server. Other implementations include the Authorization Server within the Backhaul Network 210. The authorization server can be operable to authenticate CPE devices 205a-d for transmission of data over the powerline network. When a CPE device 205a-d is not authenticated, in various implementations, the CPE device 205a-d can be provided access to a registration server 230. The registration server 230, in various implementations, can enable the user of a CPE device 205a-d to register the CPE device 205a-d with the network to obtain access to the powerline network.

In various implementations, the registration server 230 can provide a limited registration to a CPE device 205a-d to try the powerline network. For example, the registration can be limited by a period of time, bandwidth, destination address, or any other limitation that might allow the user to have limited access to the network. In additional implementations, the registration server 230 can require payment prior to using the network. For example, the registration server can provide web pages operable to collect payment information from the user. In various implementations, the registration server can allow the user to pay for any of a variety of different access plans. For example, an access plan might allow a user to purchase access for a specified period of time, at a specified bandwidth, or combinations thereof. In various implementations, the Registration Server is not co-located with the Authorization Server. In other implementations, the Registration Server and Authorization Server are co-located as shown in FIG. 2. In various implementations, the Registration Server can be part of the Backhaul Network 201.

Figure 3:
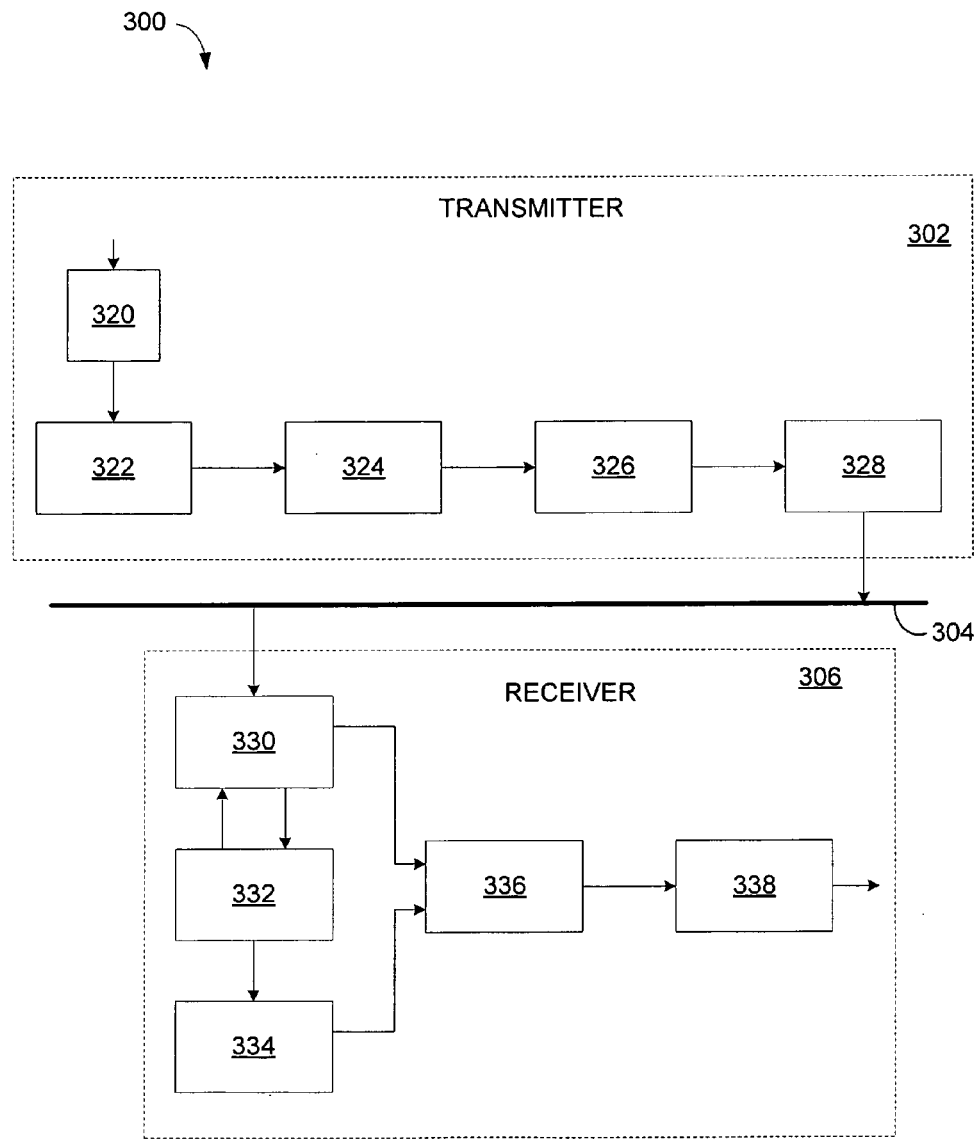
FIG. 3 is a block diagram illustrating components associated with devices communicating over the access network.

Referring to FIG. 3, a communication system 300 includes a transmitter 302 for transmitting a signal (e.g., a sequence of OFDM symbols) over a communication medium 304 to a receiver 306. The transmitter 302 and receiver 306 can both be incorporated into a network interface module at each station. The communication medium 304 can represent a path from one device to another over the power line network.

At the transmitter 302, modules implementing the PHY layer receive an MPDU from the MAC layer. The MPDU is sent to an encoder module 320 to perform processing such as scrambling, error correction coding and interleaving.

The encoded data is fed into a mapping module 322 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i = A_i \exp(j\Phi_i)$ whose real part corresponds to the I component and whose imaginary part corresponds to the Q component of a carrier with peak frequency fi. Alternatively, any appropriate modulation scheme that associates data values to modulated carrier waveforms can be used.

The mapping module 322 also determines which of the carrier frequencies f1, . . . , fN within the OFDM bandwidth are used by the system 300 to transmit information. For example, some carriers that are experiencing fades can be avoided, and no information is transmitted on those carriers. Instead, the mapping module 322 uses coherent BPSK modulated with a binary value from the Pseudo Noise (PN) sequence for that carrier. For some carriers (e.g., a carrier i=10) that correspond to restricted bands (e.g., an amateur radio band) on a medium 304 that may radiate power no energy is transmitted on those carriers (e.g., A10=0). The mapping module 322 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 324 performs the modulation of the resulting set of N complex numbers (some of which may be zero for unused carriers) determined by the mapping module 322 onto N orthogonal carrier waveforms having peak frequencies f1, . . . , fN. The modulated carriers are combined by IDFT module 324 to form a discrete time symbol waveform S(n) (for a sampling rate fR), which can be written as $$S(n) = \sum_{i=1}^{N} A_i \exp[j(2\pi i n / N + \Phi_i)] \quad \text{Eq. (1)}$$

where the time index n goes from 1 to N, Ai is the amplitude and $\Phi_i$ is the phase of the carrier with peak frequency fi=(i/N) fR, and $j=\sqrt{-1}$. In some implementations, the discrete Fourier transform corresponds to a fast Fourier transform (FFT) in which N is a power of 2.

A post-processing module 326 combines a sequence of consecutive (potentially overlapping) symbols into a "symbol set" that can be transmitted as a continuous block over the communication medium 304. The post-processing module 326 prepends a preamble to the symbol set that can be used for automatic gain control (AGC) and symbol timing synchronization. To mitigate intersymbol and intercarrier interference (e.g., due to imperfections in the system 300 and/or the communication medium 304) the post-processing module 326 can extend each symbol with a cyclic prefix that is a copy of the last part of the symbol. The post-processing module 326 can also perform other functions such as applying a pulse shaping window to subsets of symbols within the symbol set (e.g., using a raised cosine window or other type of pulse shaping window) and overlapping the symbol subsets.

An Analog Front End (AFE) module 328 couples an analog signal containing a continuous-time (e.g., low-pass filtered) version of the symbol set to the communication medium 304. The effect of the transmission of the continuous-time version of the waveform S(t) over the communication medium 304 can be represented by convolution with a function $g(\tau;t)$ representing an impulse response of transmission over the communication medium. The communication medium 304 may add noise n(t), which may be random noise and/or narrow-band noise emitted by a jammer.

At the receiver 306, modules implementing the PHY layer receive a signal from the communication medium 304 and generate an MPDU for the MAC layer. An AFE module 330 operates in conjunction with an Automatic Gain Control (AGC) module 332 and a time synchronization module 334 to provide sampled signal data and timing information to a discrete Fourier transform (DFT) module 336.

After removing the cyclic prefix, the receiver 306 feeds the sampled discrete-time symbols into DFT module 336 to extract the sequence of N complex numbers representing the encoded data values (by performing an N-point DFT). Demodulator/Decoder module 338 maps the complex numbers onto the corresponding bit sequences and performs the appropriate decoding of the bits (including deinterleaving and descrambling).

Any of the modules of the communication system 300 including modules in the transmitter 302 or receiver 306 can be implemented in hardware, software, or a combination of hardware and software.

Various stations in a network may generate regular beacon transmissions for various purposes. A beacon transmission (or simply a "beacon") includes management information that can be used for a variety of purposes. The stations may communicate with each other in time periods between beacon transmissions, provided the power line channel characteristics between any two communicating stations permit it.

One of the functions of a beacon transmission is to carry medium allocation (or scheduling) information. The scheduling information can allocate some of the time between beacon transmissions as a contention period during which stations may contend for access to the power line medium. The scheduling information can also allocate a contention-free period during which times slots are assigned to particular stations for access to the power line medium. The scheduling information is provided relative to a TDMA Scheduling Period Start Time (or TDMA Period Start Time).

The TDMA Period start time is synchronized with respect to the AC line cycle of the power line waveform such that the time between consecutive TDMA period start times is based on the underlying AC line cycle frequency. Thus, to the extent that the AC line cycle frequency varies, the TDMA period start time (and hence the duration of each TDMA Period) may not be perfectly periodic. Since the beacons transmitted by the HE may not be heard by every station, each station transmits its own beacon to relay the information in the beacon to stations that do not hear the HE. While the stations may transmit their beacons at different times, the TDMA period start time is established with respect to the information contained in the beacons transmitted by the HE. At each station, the TDMA period start time can be synchronized to that of the HE using a start time synchronization procedure described in more detail below. Each station can then predict a given TDMA period end time (or future TDMA period start time) based on the synchronized start time and the local AC line cycle at the given station by correlating the synchronized start time to a detectable feature of the power line waveform such as a zero crossing. The TDMA period can be set by the HE to any multiple of a half of the AC line cycle period, for example, by waiting for a given number of zero crossings.

In some cases it is desirable to increase the TDMA period to make more efficient use of the medium by reducing the percentage of time devoted to sending the "overhead" information in the beacon transmission. There is also overhead information associated with transmissions from the stations during each TDMA Period. It may also be desirable to keep the beacon period small enough to provide a desired number of transmission opportunities in a given length of time to reduce the latency. Thus, the TDMA period can be selected according to a trade-off between keeping overhead low and latency between transmission opportunities low. For example, in some implementations the TDMA period is selected to be twice the AC line cycle period. In this case, when operating in power line environments with an AC line cycle frequency of 60 Hz, the TDMA period would be approximately 33.33 msec. When operating in power line environments with an AC line cycle frequency of 50 Hz, the TDMA period would be approximately 40 msec. Variations in the TDMA period may occur due to drift in the AC line cycle frequency. The HE determines the duration of the TDMA period as well as the start time of the TDMA period.

Figure 4:
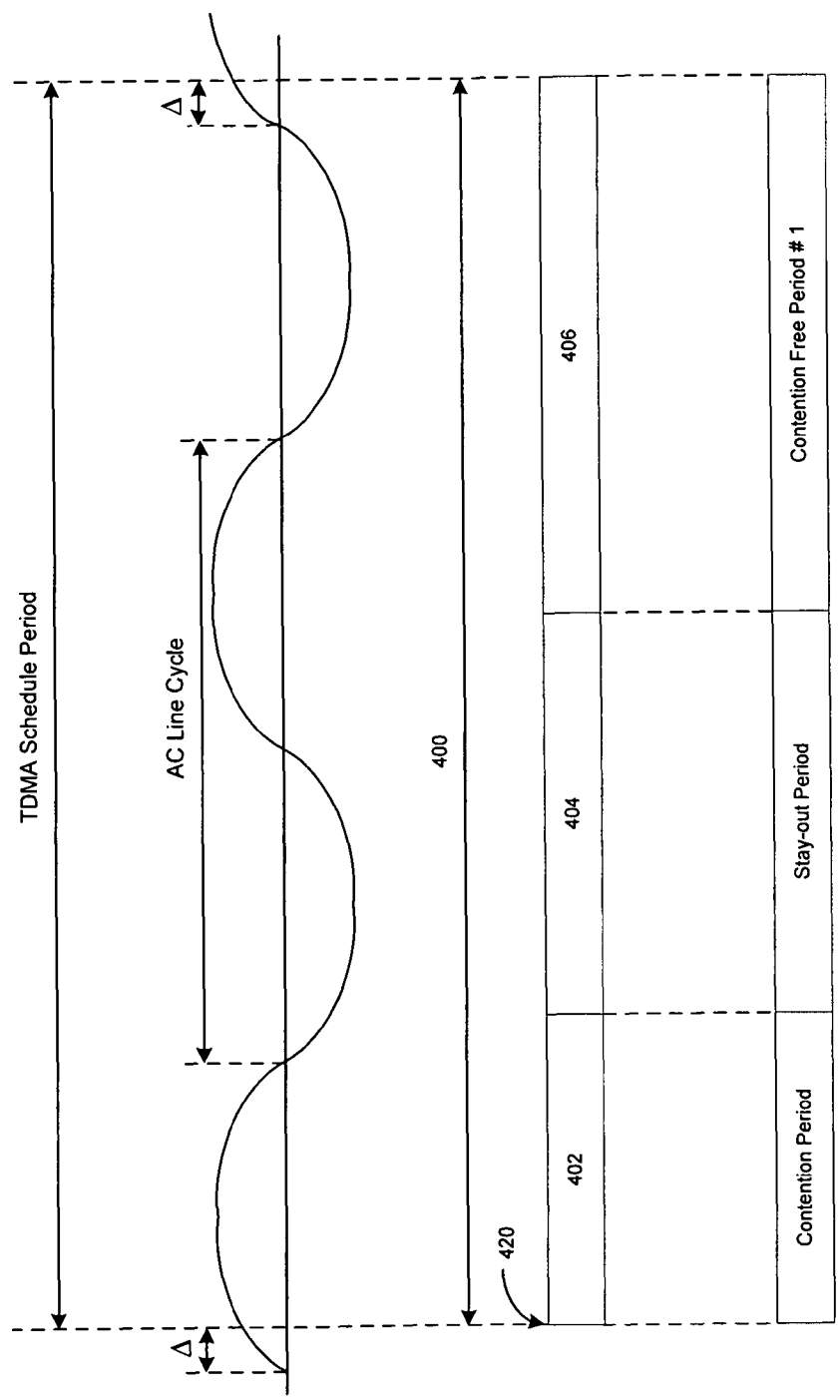
FIG. 4 is a timing diagram of a beacon period.

FIG. 4 shows the structure of an exemplary TDMA period 400 which consists of a Contention Period 402 followed by a Stay-out Period 404 and a Contention Free Period 406. In general, a TDMA period can contain any number of Contention Periods, Stay-out Periods and Contention Free Periods in any order. The TDMA period may also be different for different stations in the BPLN. The Contention Period 402 is a time in which stations can contend for permission to transmit using a shared medium access protocol such as CSMA/CA. The Stay-out Period 404 is a time during which stations are not allowed to transmit. The Contention Free Period 406 can include time slots assigned for use by predetermined stations (e.g., using a Time Domain Multiple Access (TDMA) protocol). Beacons are typically transmitted during the Contention Period. Beacon may also be transmitted during Contention Periods. The frequency of beacon transmission depends on how frequently the associated management information needs to be communicated. Typically, beacons can be transmitted once in several TDMA periods.

In networks in which repeaters are used to extend the reach of signals in the network, multiple stations can retransmit beacons transmissions to be heard by stations that would otherwise not be able to receive the beacons transmissions from the HE.

Figure 5:
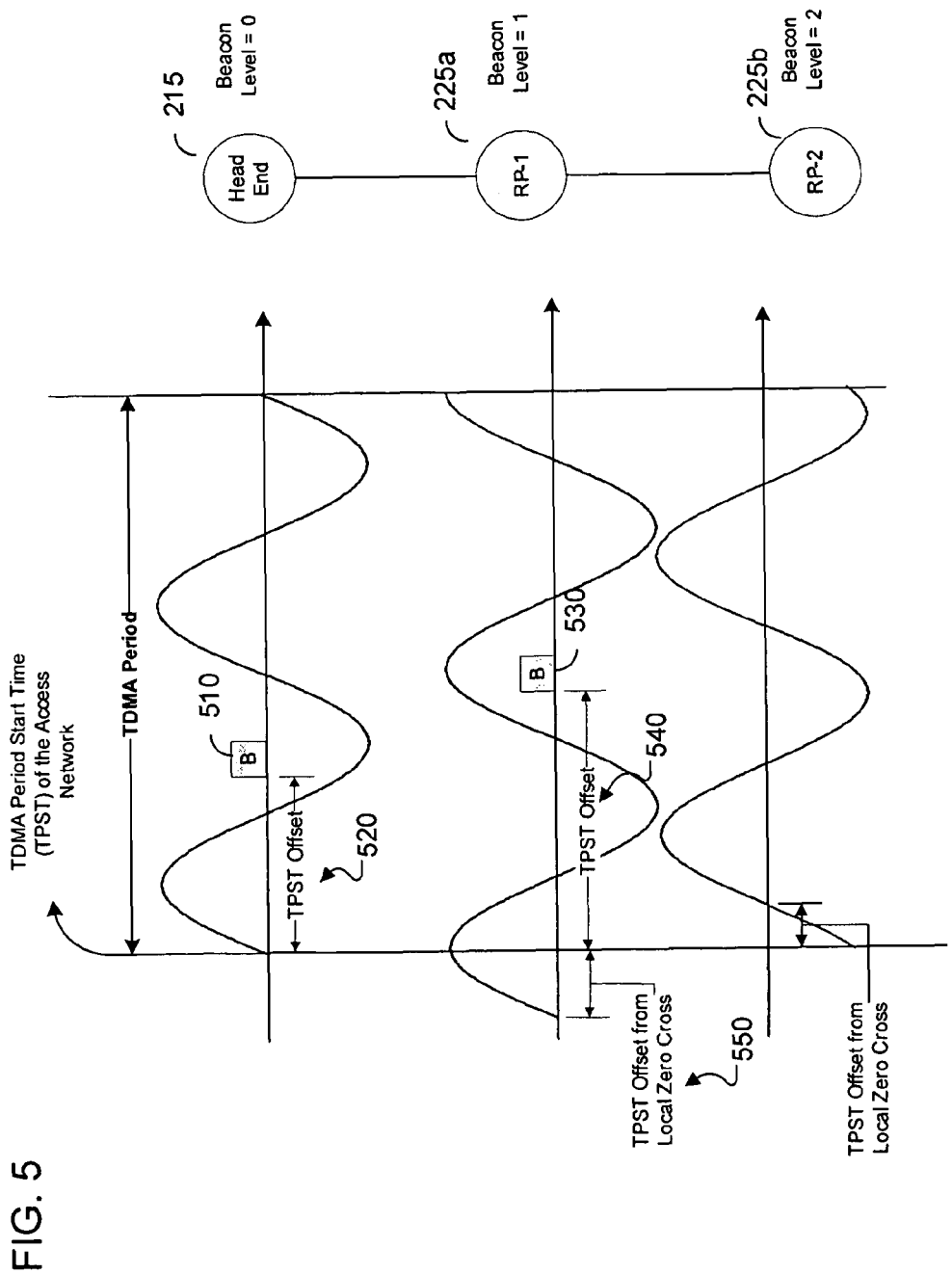
FIG. 5 is a timing diagram illustrating synchronization of devices using a beacon period start time offset.

FIG. 5 is a timing diagram illustrating synchronization of multiple levels of stations using a beacon signal. In some implementations, the headend 215 can originate a beacon signal 510. The beacon signal 510 can include a TDMA period start time (TPST) offset 520. The TSPT offset 520 can indicate the time period between the start time of the TDMA period and the time at which the corresponding beacon is transmitted. A repeater 225a can receive the beacon signal 510. Based upon the beacon signal 510, the repeater 225a can synchronize its clock to the headend.

However, as can be seen with respect to FIG. 2, the beacon signal generated by the headend is not received by each of the repeater devices (e.g., repeater devices 225-b-d). Thus, the repeater devices that receive the beacon signal can generate a local beacon signal 530. The local beacon signal 530 can include a TPST offset 540 that corresponds to the derived synchronization from the headend 215 zero crossing as well as a local TPST offset 550 from the local repeater's (repeater 225a) zero crossing. A second level repeater 225b, upon receiving the beacon signal 530 from the first level repeater device 225a, can derive synchronization with the headend 215 based upon the beacon signal 530. In some implementations, the synchronization can be derived based upon TPST offset 540 and local TPST offset 550.

In various implementations, the local beacon signals can be generated by any station in the network, including the NTUs (e.g., NTUs 220a-e of FIG. 2) and/or CPEs (e.g., CPEs 205a-d of FIG. 2). Thus, the headend's TDMA period start time can be communicated to every station in an access network. Such synchronization of the TDMA Period start time throughout the network can be used to facilitate time-based access to the access network, for example, by using time division multiple access (TDMA) protocols.

In some implementations, the access network can facilitate coexistence networks. In such implementations, the access media can be shared, for example, by using a time based access sharing plan. In some implementations, the access network can provide half of a TDMA period for use by the access network stations, and the remainder of the TDMA period for use by coexistence networks. In general, the sharing of the TDMA period can be divided in any proportion between access network and the coexistence network based on predetermined policy.

Figure 6:
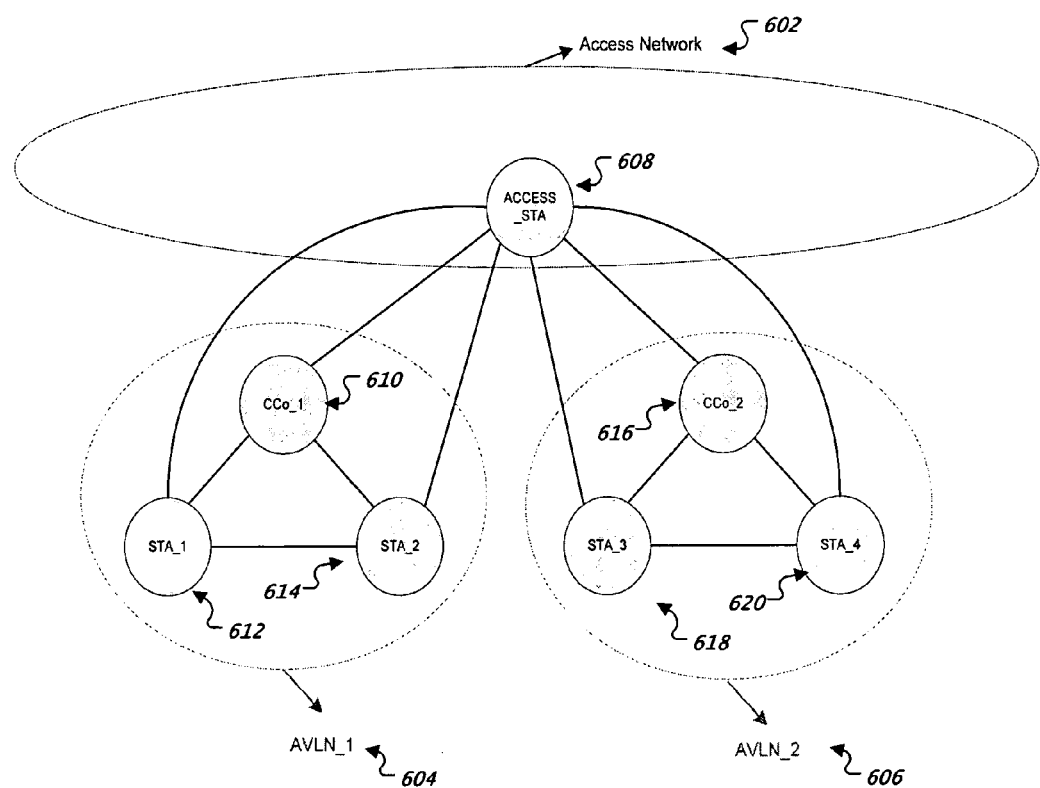
FIG. 6 is a block diagram illustrating an example communications network.

FIG. 6 is a block diagram illustrating an example communications network. The communications network includes an access network 602 that can communicate with two in-home network, AVLN1 604 and AVLN2 606. The access network 602, AVLN1 604, and AVLN2 606 can coordinate to share bandwidth access within network.

In some implementations, the access network 602 can include an access station, ACCESS_STA 608. For example, the ACCESS_STA 608 can be a headend (e.g., headend 215 of FIG. 2). The in-home networks, AVLN1 604 and AVLN2 606, can include one or more stations. For example, CCo_1 610, STA_1 612 and STA_2 614 belong to AVLN_604. Furthermore, CCo_2 616, STA_3 618 and STA_4 620 belong to AVLN_2 606. In FIG. 6, the devices that can receive signals from each other directly are connected with solid lines. Therefore, in FIG. 6, AVLN1 604 and AVLN2 606 cannot receive signals from each other directly. However, the ACCESS_STA1 608 of the access network 602 can receive signals from all the devices in AVLN1 604 and AVLN2 606.

In FIG. 6, the access network 602, AVLN1 604, and AVLN2 606 can synchronize communications in order to share bandwidth access in the network. For example, bandwidth access can be defined by an interval period that is part of a TDMA period. However, because AVLN1 604 and AVLN2 606 cannot communicate directly with each other, it can be difficult for AVLN1 604 and AVLN2 606 to share bandwidth access because neither receives the signals initiated by the other. Therefore, in one example, AVLN1 604 and AVLN2 606, may independently recognize the access network 602 and request 50% of the Beacon period, leaving the additional 50% of the Beacon period for the access network 602. However, in this example, if AVLN1 604 and AVLN2 606 are both utilizing 50% of the beacon period, this could result in zero bandwidth for the access network 602 if the requests from AVLN1 604 and AVLN2 606 do not overlap.

The example described above with respect to FIG. 6 represents an extreme case for a communications network. However, the example illustrates how non-coordination among the access networks and in-home networks can impede bandwidth and QoS attributes of the communications network. To overcome this problem, a method can be implemented to provide synchronization information for in-home networks, i.e. AVLN1 604 and AVLN2 606, from the access network 602. In some implementations, the access network 602 can provide TDMA intervals within a TDMA period during which one or more in-home networks can access the communications medium. Providing an access interval period from the access network to the in-home networks can enable the in-home networks to update their TDMA period so that none of the in-home devices will access the communication medium during the access network's 602 TDMA period.

Figure 7:
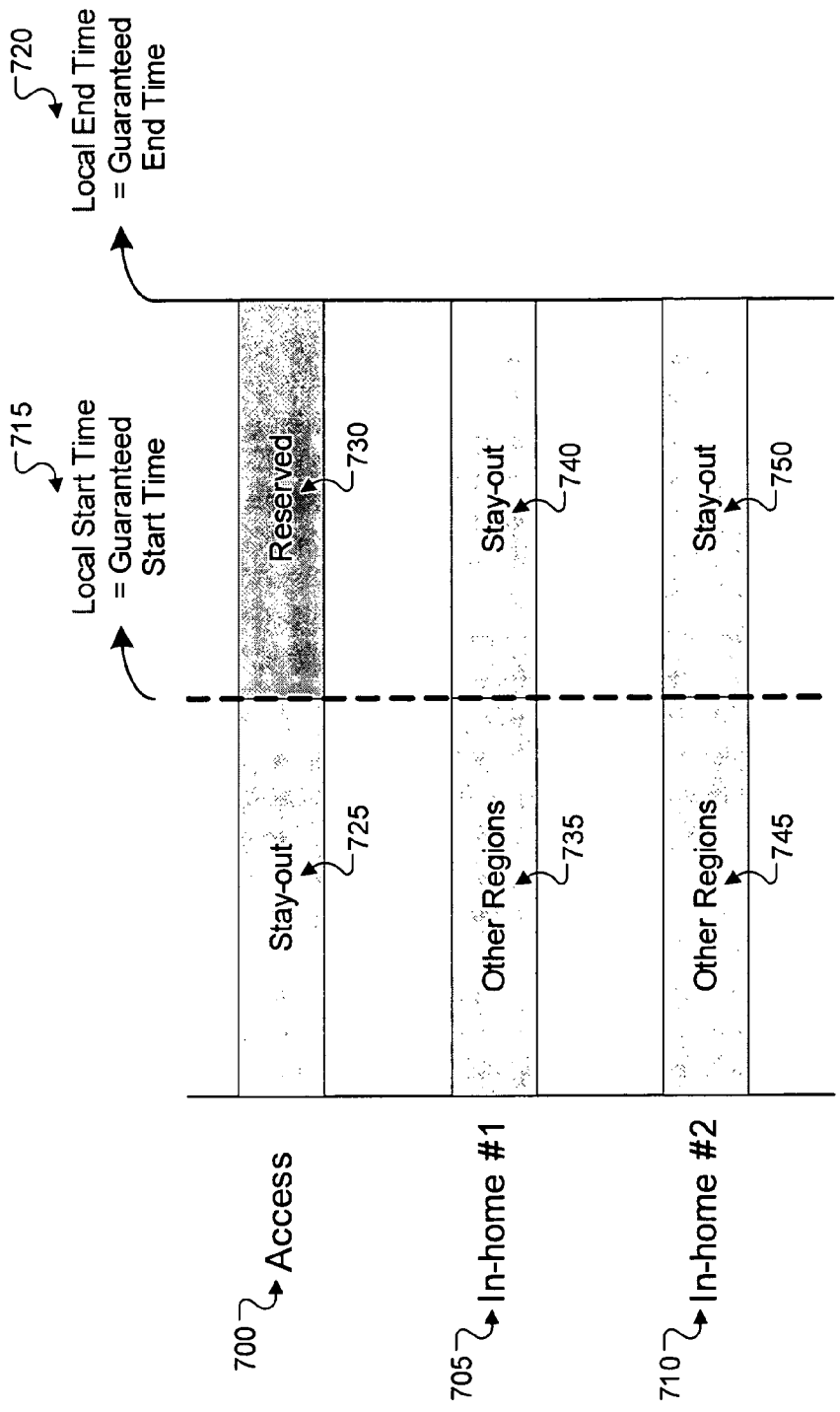
FIGS. 7-9 are timing diagrams illustrating example allocations of bandwidth on shared communication media.

FIG. 7 is a timing diagram illustrating an example timing for an access network 700 and one or more coexistence networks 705, 710. In some implementations, the access network 700 can designate two regions. The two regions, for example, can be delineated by a guaranteed start time and a guaranteed end time, defining a guaranteed interval period and an in-home interval period. The guaranteed interval period can represent a minimum amount of time for the access network to access a medium during a high traffic period, while the in-home interval period can represent a minimum amount of time for one or more in-home networks to access the medium. In one implementation, policy can define a default time for the guaranteed interval period. In some examples, the policy can set the default time for the guaranteed interval period to be equal to half of the beacon period, thereby leaving the one or more in-home networks the remaining half of the beacon period. In some implementations, the guaranteed interval period of the access network can be utilized at the end of the beacon period, while the in-home interval period can be utilized at the beginning of the beacon period.

In the example of FIG. 7, both the access network and the in-home network require the full default bandwidth (e.g., 50% of the beacon period). In such examples, the separation of the regions can be marked by a "local start time" marker 715, while the end of the period can be marked by a "local end time" marker 720. In some examples, a first region can be designated as a "Stay-out" region 725. The "Stay-out" region 725 can designate the first region as used by coexistence networks 705, 710. A second region can be designated as a "Reserved" region 730. The "Reserved" region 730 can designate the second region as used by the access network 700. The "Reserved" region 730 can begin at the "local start time" marker 715 and end at the "local end time" marker 720. In various implementations, stations in the access network can communicate the local start time and local end time as part of the beacon transmission.

In some implementations, a first coexistence network 705 can designate two regions. A first region can be designated as "Other Regions" 735. The "Other Regions" 735 can define a time period during which stations in the coexistence network can transmit. For example, "Other Regions" can include intervals where all station in the coexistence network 705 can transmit using a contention based channel access. "Other Regions" can also include intervals where a specific station or traffic stream (for example, Video stream or Voice over IP Stream) is allowed contention free access within the coexistence network 705. Furthermore, "Other Regions" can also include intervals where all stations in the coexistence networks 705 and 710 can share the medium using a contention based channel access. A second region can be designated as a "Stay-out" region 740. The "Stay-out" region 740 can define a time period during which the coexistence stations of the first coexistence network 705 are instructed not to communicate information.

In some implementations, a second coexistence network 710 can designate two regions. A first region can be designated as "Other Regions" 745. The "Other Regions" 745 can define a time period during which stations in the coexistence network can transmit. A second region can be designated as a "Stay-out" region 750. The "Stay-out" region 750 can define a time period during which the coexistence stations of the first coexistence network 710 are instructed not to communicate information.

In various implementations, the "Other Regions" and "Stay-out" regions can be communicated by one or more station in the coexistence network. Some implementations of the coexistence network include a HomePlug AV specification based in-home network. In HomePlug AV networks, the TDMA Period is set to two times the AC line cycle period. In one implementation is for the access HE to specify a TDMA Period of two times the AC line cycle for coexistence with HomePlug AV based in-home coexistence networks. In some implementations, the "Reserved" and "Stay-out" regions for the access network can be communicated to the HomePlug AV network using HomePlug AV type beacons with Regions BENTRY to indicate the demarcation of various regions within the TDMA Period. An implementation is for the HomePlug AV network to use its Regions BENTRY to indicate to the access network its "Stay-out" and "Other" Regions. Regions BENTRY in HomePlug AV Beacons include Other Regions such as CSMA Region, Reserved Region, Beacon Region, etc. In general, HomePlug AV networks may specify multiple disjoint Stay-out Regions, Reserved Regions etc. Another implementation can use a special BENTRY in the Beacon for communicating the regions information between access and HomePlug Av networks.

In scenarios where the Central Coordinator (CCo) of the HomePlug AV network cannot directly hear any stations within the Access network, it can appoint a station that can hear both the CCo and one or more stations in the Access network as a Proxy Coordinator (PCo). Proxy Coordinator provides the function of relaying the coexistence intervals information (or regions information) between the access network and the CCo.

Figure 8:
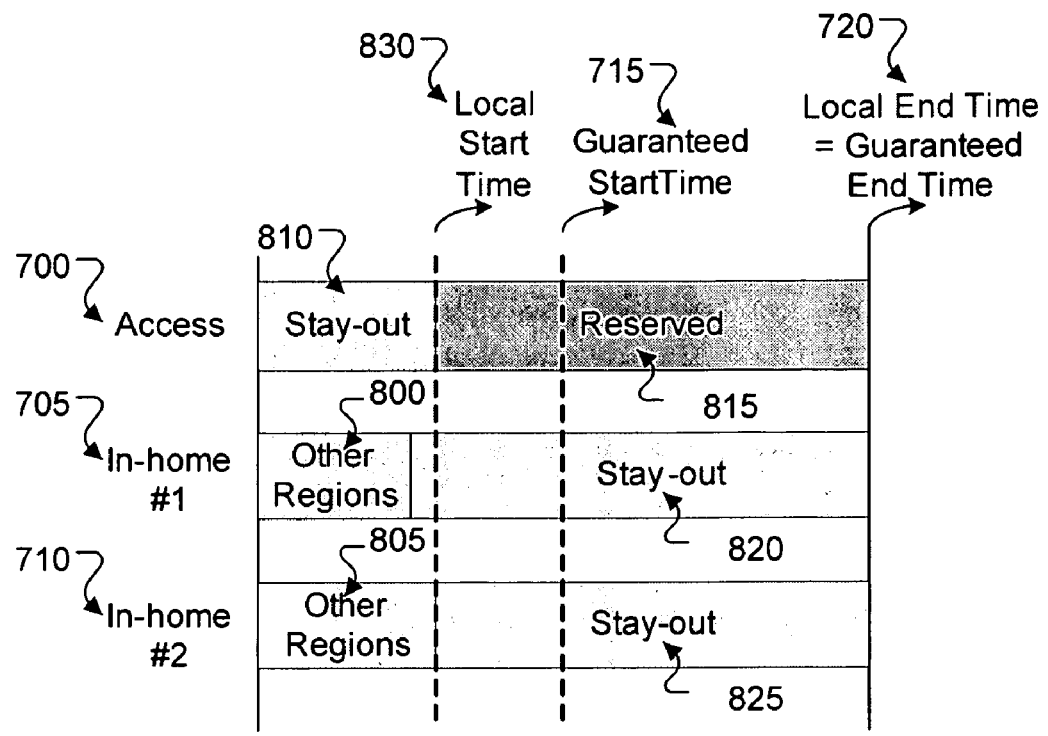

FIG. 8 is a timing diagram illustrating another example timing for an access network 700 and one or more coexistence networks 705, 710. In the example of FIG. 8, the coexistence networks 705, 710 are underloaded. The coexistence networks 705, 710 in such examples have only requested a portion of the bandwidth available to the coexistence networks 705, 710.

In some implementations, a first coexistence network 705 can identify a first "Other Regions" time period 800 during which the first coexistence network 705 is planning to transmit data. Similarly, a second coexistence network 710 can identify a second "Other Regions" time period 805 during which the second coexistence network 710 is planning to transmit data. Based on the specification of these regions, the access network can dynamically identify a "Stay-out" region 810 based on the maximum of the first "Other Regions" time period 800 and the second "Other Regions" time period 805. The maximum of the first "Other Regions" time period 800 and the second "Other Regions" time period 805 can be identified by a local start time 830. It is important to note that different stations in the Access network will see different in-home coexistence networks. Hence the selection of "local start time" and "local end time" at each station in the access network has to be based on the set of in-home coexistence networks that are visible to it and should also take into account the duration of the "stay-out" regions communicated by all detectable in-home networks. For example, station A might receive traffic from in-home network devices IH1, IH2, and IH3, while station B might receive traffic from in-home network devices IH1, IH3, and IH4. In this example, station A would not receive traffic from IH4, and station B would not receive traffic from IH2. Thus, station A would base the "local start time" and "local end time" on only IH1, IH2, and IH3, while station B would base its "local start time" and "local end time" on only IH1, IH3, and IH4.

In some implementations, the identification of the local start time 830 can also identify the beginning of a "Reserved" region 815 associated with the access network 700. The "Reserved" region 815 can run from the local start time 830 to the guaranteed end time 720, which can also be referred to as the local end time. The coexistence networks 705, 710 can identify "Stay-Out" regions 820, 825 based upon the time periods that the coexistence networks 705, 710 have given up based upon the specification of the first "Other Regions" time period 800 and second "Other Regions" time period 805.

Figure 9:
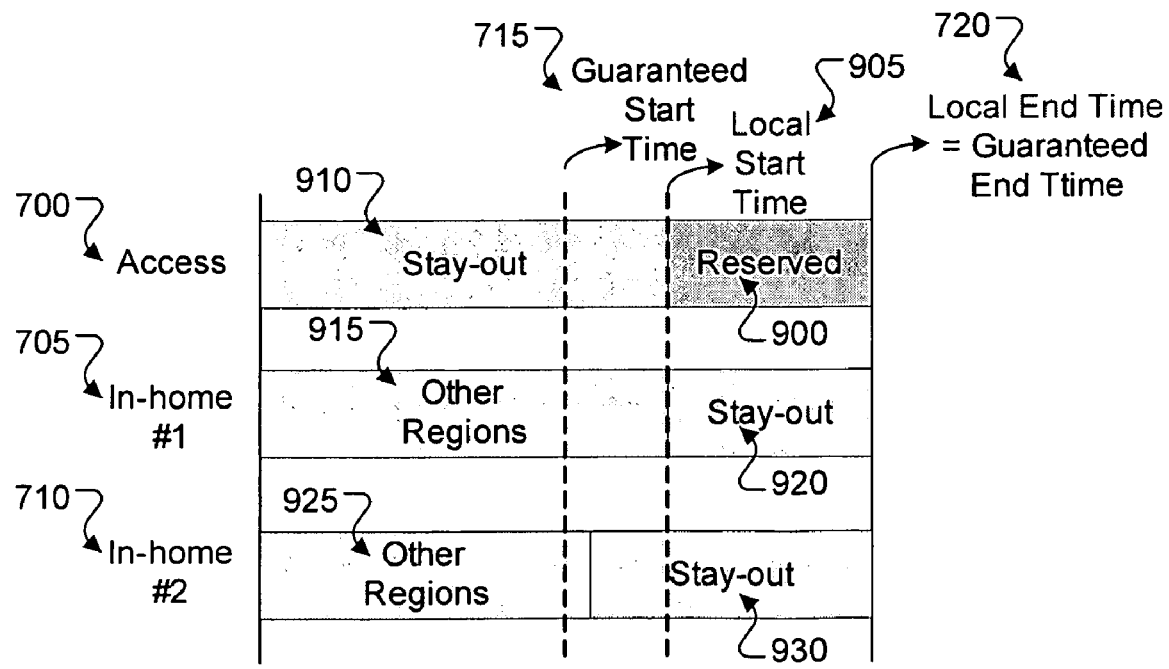

FIG. 9 is a timing diagram illustrating another example timing for an access network 700 and one or more coexistence networks 705, 710. In the example of FIG. 9, the access network 700 is underloaded. The access network 700 in such examples have only requested a portion of the bandwidth available to the access network 700.

In some implementations, an access network 700 can identify a "Reserved" time period 900 during which the access network 700 is planning to transmit data. The "Reserved" time period 900 can define a "Local Start Time" 905 for each of the devices 700, 705, 710. The remainder of the period can be assigned as a "Stay-out" region for the access network.

In some implementations, a first coexistence network 705 can use the "Local Start Time" 905 to define a maximum time available to the first coexistence network 705. In this example, the first coexistence network 705 requests allocation of the bandwidth by defining "Other Regions" period 915 extending to the "Local Start Time" 905. The period outside of the "Other Regions" period 915 can be defined as the "Stay-out" period 920. The second coexistence network 710 can similarly use the "Local Start Time" 905 to define a maximum start time available to the second coexistence network 710. In this example, the second coexistence network 710 requests an allocation of the bandwidth by defining "Other Regions" period 925. The period outside of the "Other Regions" period 925 can be defined as the "Stay-out" period 930.

In some implementations, requests for allocation of bandwidth can be made within each coexistence network independently of the requests made by other coexistence networks. For example, in FIG. 9 the access network requests the "Reserved" region 900, while the first coexistence network 705 requests "Other Regions" period 915, and the second coexistence network 710 requests "Other Regions" period 925. In such an example, each of the coexistence networks 705, 710 can dynamically and independently define regions based upon allocation requests (e.g., bandwidth requirements of the networks). It is important to note that different in-home networks will see different stations in the access networks. Hence the selection of "Other Regions" at each in-home coexistence network has to be based on the set of access stations that are visible to it and should also take into account the duration of the "stay-out" regions communicated by all such stations in the access networks. For example, in-home network IH1 might receive traffic from access network stations A, B, and C, while in-home network IH2 might receive traffic from access network stations A, B, and D. In this example, IH1 would not receive traffic from station D, and IH2 would not receive traffic from station C. Thus, IH1 would base in-home interval period on only access network stations A, B, and C, while IH2 would base its in-home interval period on only A, B, and D.

Figure 10:
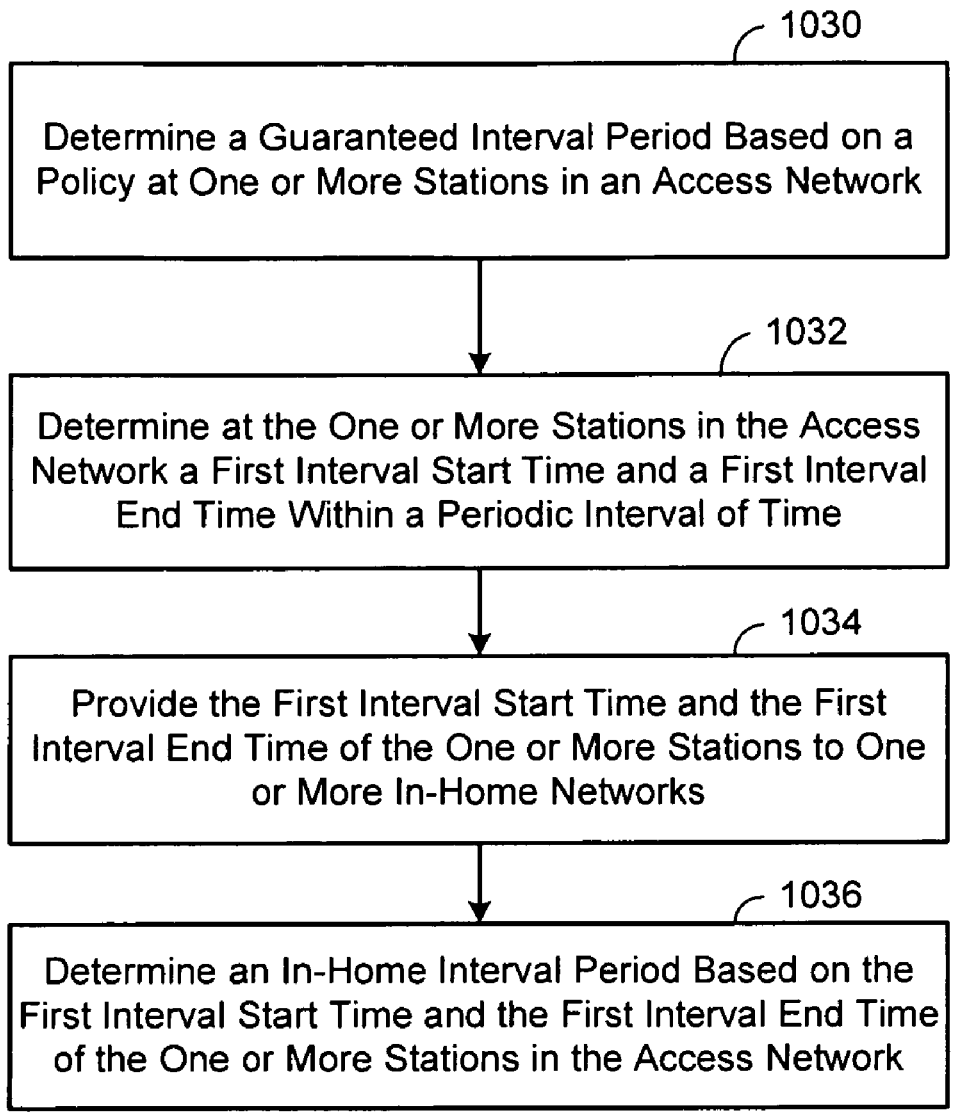
FIG. 10 is a flow chart illustrating an exemplary process for synchronizing communications among stations in a network.

FIG. 10 is a flow chart illustrating an exemplary process for synchronizing communications among stations in a network. For example, the network can include an access network and one or more in-home networks that can comprise a broadband over power line network At stage 1030, a guaranteed interval period comprising a guaranteed interval start time and a guaranteed interval end time within a periodic interval of time based on a policy can be determined at one or more stations in an access network. For example, the guaranteed interval period represents a minimum amount of time for the access network to access a medium. In one implementation, a default time for the guaranteed interval period can be equal to half of the beacon period. In one implementation, the guaranteed interval period of the access network can be utilized at the end of the beacon period. In another implementation, the in-home interval period can be utilized at the beginning of the beacon period.

In one implementation, the access network can determine the guaranteed interval period when at least one in-home network is present. For example, the guaranteed interval period can be determined by a head end of the access network.

In another implementation, one or stations in an access network can determine the guaranteed interval start time and a guaranteed interval end time by receiving guaranteed interval period information from a head end of the access network. For example, the guaranteed interval period information provided by the head end can include the start and end time of the guaranteed interval period within the periodic interval of time.

In one implementation, the policy utilized by the one or more stations in an access network to determine the guaranteed interval period can define a percentage of time within the periodic interval of time that the access network can utilize. In another implementation, the utilized policy can determines a duration of the periodic interval of time that the access network can utilize. In another implementation, the policy is based on a number of in-home networks that a station in the access network detects. In another implementation, the policy is based on the priority of traffic being utilized by the in-home network and the access network.

At stage 1032, a first interval start time and a first interval end time within the periodic interval of time can be determined at the one or more stations in the access network, wherein the first interval start times and first interval end times are different than the guaranteed interval start time and the guaranteed interval end time. For example, in one implementation, the first interval end time is fixed for the one or more stations in the access network, and the first interval start time is adjustable for the one or more stations in the access network based on a network demand.

In one implementation, determining at the one or more stations in the access network a first interval start time and a first interval end time within the periodic interval of time can include monitoring a traffic load for one or more connected in-home networks and the guaranteed interval period, and adjusting the local access start time based on the monitoring. In other implementations, access stations can obtain from the head end of the access network the first interval start time and first interval end time within the periodic interval of time. In such implementations, the head end can monitor traffic on the network and identify first interval start times and first interval end times for the access network stations.

At stage 1034, the first interval start time and the first interval end time of the one or more stations in the access network can be provided to one or more in-home networks. In one implementation, the one or more in-home networks can monitor the access network to determine the first interval start time and the first interval end time of the one or more stations in the access network.

At stage 1036, an in-home interval period can be determined at one or more in-home networks based on the first interval start time and the first interval end time of the one or more stations in the access network. For example, the in-home interval period can represent an amount of time for the in-home network to access a medium.

In one implementation, the in-home network may require more bandwidth. For example, the access network can determine that the in-home network requires more bandwidth by monitoring the network traffic load of the in-home network. In response to determining that the in-home network requires more bandwidth, the guaranteed interval period which includes the guaranteed interval start time and the guaranteed interval end time within a periodic interval of time can be decreased.

In another implementation, the access network may require more bandwidth. For example, the access network can determine that it requires more bandwidth based on its network traffic loads. In response to determining that the access network requires more bandwidth, the guaranteed interval period which includes the guaranteed interval start time and the guaranteed interval end time within a periodic interval of time can be increased.

In another implementation, the access network can determine whether the in-home network is a HomePlug AV network. In response to determining that the in-home network is a HomePlug AV network, the access network can utilize the guaranteed interval period at the access network. Furthermore, the in-home network can utilize a stay-out region to indicate a period of time that the in-home network is not utilizing.

In another implementation, the access network can set the in-home interval period at the in-home network at half of the beacon period. In response to setting the in-home interval period at half of the beacon period, the access network can adjust the guaranteed interval period of a beacon period at the head end of the access network.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

These and other implementations are within the scope of the following claims.

What is claimed is:

1. A method of sharing time on a shared medium between an access network and one or more in-home networks, comprising:
   determining a guaranteed interval period comprising a guaranteed interval start time and a guaranteed interval end time within a periodic interval of time based on a policy at one or more stations in an access network, wherein the policy includes a guaranteed proportion of time or a duration within the period interval of time for the access network to utilize;
   the one or more stations in the access network monitoring a traffic load on the one or more in-home networks, wherein the access network and the one or more in-home networks are different networks;
   determining at the one or more stations in the access network a first interval start time and a first interval end time within the periodic interval of time based on said monitoring, wherein the first interval start times and first interval end times are not required to be identical to the guaranteed interval start time and the guaranteed interval end time, respectively;

providing the first interval start time and the first interval end time of the one or more stations in the access network to the one or more in-home networks;

receiving an in-home interval period from each of the one or more in-home networks, wherein each in-home interval period is based on the provided first interval start time and the first interval end time of the one or more stations in the access network;

after receiving each of the in-home interval periods from the one or more in-home networks, the one or more stations in the access network monitoring the traffic load on the one or more in-home networks to determine that the access network or one of the in-home networks requires more bandwidth; and in response to determining that the access network or one of the in-home networks requires more bandwidth, increasing or decreasing the guaranteed interval period, respectively.

2. The method of claim 1, wherein the access network and the in-home network comprise a broadband over power line network.

3. The method of claim 1, wherein the guaranteed interval period represents a minimum amount of time for the access network to access a medium.

4. The method of claim 1, wherein the access network determines the guaranteed interval period when at least one in-home network is present.

5. The method of claim 1, wherein determining a guaranteed interval start time and a guaranteed interval end time comprises:

receiving guaranteed interval period information from a head end of the access network.

6. The method of claim 5, wherein the guaranteed interval period information provided by the head end includes the start and end time of the guaranteed interval period within the periodic interval of time.

7. The method of claim 1, wherein the policy defines a percentage of time within the periodic interval of time that the access network can utilize.

8. The method of claim 1, wherein the policy determines a duration of the periodic interval of time that the access network can utilize.

9. The method of claim 1, wherein the policy is based on a number of in-home networks that a station in the access network detects.

10. The method of claim 1, wherein the policy is based on the priority of traffic being utilized by the in-home network and the access network.

11. The method of claim 1, wherein the first interval end time is fixed for the one or more stations in the access network.

12. The method of claim 1, wherein the first interval start time is adjustable for the one or more stations in the access network based on an access network demand.

13. The method of claim 12, wherein the first interval start time is selected as the minimum required to meet the access network demand when the access network demand is less than the guaranteed interval.

14. The method of claim 12, wherein the first interval start time is selected as the minimum required to meet the access network demand when the access network demand is greater than the guaranteed interval and less than the interval indicated by the in-home network.

15. The method of claim 12, wherein the first interval start time is selected as the maximum available to the access network while still meeting the traffic load on the one or more in-home networks when the access network demand is greater than the guaranteed interval and the interval indicated by the in-home network, and the traffic load on the one or more in-home networks is less than the guaranteed interval.

16. The method of claim 12, wherein the first interval start time is selected as the minimum required to meet the traffic load on the one or more in-home networks when the traffic load on the one or more in-home networks is less than the guaranteed interval.

17. The method of claim 12, wherein the first interval start time is selected as the minimum required to meet the traffic load on the one or more in-home networks when the traffic load on the one or more in-home networks is greater than the guaranteed interval and less than the interval indicated by the access network.

18. The method of claim 12, wherein the first interval start time is selected as the maximum available to the in-home network while still meeting the access network demand when the traffic load on the one or more in-home networks is greater than the guaranteed interval and the interval indicated by the access network, and the access network demand is less than the guaranteed interval.

19. The method of claim 12, wherein access network demand is assessed by a headend device monitoring network traffic.

20. The method of claim 1, wherein the in-home interval period represents an amount of time for the in-home network to access a medium.

21. The method of claim 1, wherein a default time for the guaranteed interval period is equal to half of the periodic interval.

22. The method of claim 1, wherein the guaranteed interval period is utilized at the end of the periodic interval.

23. The method of claim 1, wherein the in-home interval period is utilized at the beginning of the periodic interval.

24. The method of claim 1, comprising:
determining whether the in-home network is a HomePlug AV network;
using a the guaranteed interval period at the access network; and
using a stay-out region at the in-home network to indicate a period of time that the in-home network is not utilizing.

25. The method of claim 1, further comprising:
adjusting the guaranteed interval period of the periodic interval at the head end of the access network;
wherein the in-home interval period is set at half of the period interval.

26. The method of claim 1, wherein the in-home network is a HomePlug AV network.

27. The method of claim 1, wherein the in-home network is an IEEE P1901 in-home network.

28. The method of claim 1, wherein the access network is an IEEE P1901 access network.

29. The method of claim 1, wherein the access station utilizes HomePlug AV Beacons with Regions BENTRY to communicate the first interval start time and the first interval end time.

30. The method of claim 1, wherein the access network utilizes Reserved Regions to indicate the first interval start time and the first interval end time.

31. The method of claim 1, wherein the in-home network utilizes Stay-out regions to indicate intervals of time that it is not utilizing.

32. The method of claim 1, wherein the start time and end time of the access and in-home intervals are synchronized with respect to alternating current line cycle.

33. The method of claim 1, wherein synchronization is provided by the access network to all in-home networks.

34. A system, comprising:
one more stations in an access network configured to:
determine a guaranteed interval period comprising a guaranteed interval start time and a guaranteed interval end time within a periodic interval of time based on a policy, wherein the policy includes a guaranteed proportion of time or a duration within the period interval of time for the access network to utilize;
monitor a traffic load on one or more in-home networks, wherein the access network and the one or more in-home networks are different networks;
determine a first interval start time and a first interval end time within the periodic interval of time based on said monitoring, wherein the first interval start times and first interval end times are not required to be identical to the guaranteed interval start time and the guaranteed interval end time, respectively;
provide the first interval start time and the first interval end time of the one or more stations in the access network to the one or more in-home networks;
receive an in-home interval period from each of the one or more in- home networks, wherein each in-home interval period is based on the provided first interval start time and the first interval end time of the one or more stations in the access network;
after receiving each of the in-home interval periods from the one or more in-home networks, monitor the traffic load on the one or more in-home networks to determine that the access network or one of the in-home networks requires more bandwidth; and
in response to determining that the access network or one of the in-home networks requires more bandwidth, increase or decrease the guaranteed interval period, respectively.

35. The system of claim 34, wherein the one or more stations comprise head end units, repeaters, network termination units, and customer premise equipment.

* * * * *